M. L. KEIZUR.
VEHICLE FENDER.
APPLICATION FILED MAY 2, 1916.

1,212,497.

Patented Jan. 16, 1917.
2 SHEETS—SHEET 1.

WITNESSES.

INVENTOR.
Marcus L. Keizur

M. L. KEIZUR.
VEHICLE FENDER.
APPLICATION FILED MAY 2, 1916.

1,212,497.

Patented Jan. 16, 1917.
2 SHEETS—SHEET 2.

WITNESSES:

INVENTOR.
Marcus L. Keizur

UNITED STATES PATENT OFFICE.

MARCUS L. KEIZUR, OF BAKER, OREGON.

VEHICLE-FENDER.

1,212,497. Specification of Letters Patent. Patented Jan. 16, 1917.

Application filed May 2, 1916. Serial No. 94,907.

*To all whom it may concern:*

Be it known that I, MARCUS L. KEIZUR, a citizen of the United States, residing at Baker, in the county of Baker and the State of Oregon, have invented a new and useful Vehicle-Fender, of which the following is a specification.

My invention relates to vehicle fenders for the protection of pedestrians and has for its object to provide an effective pliable net buffer comprising a near vertical and a near horizontal net in combination with an automobile or other vehicle, in which the upper portion of the fender will automatically yield and be depressed rearwardly under the impact of the upper and heavier portion of the human body to neutralize the shock of impact therewith, and coincidently with the said rearward depression and by means of the arrangement of the various connections of the upper and lower supporting frames the lower portion of the near vertical net will be extended forward and upward, forming a hammock-like pocket to carry the person struck, the horizontal net being tilted into an approximately vertical position to protect the person struck from impact with the top portion of the vehicle.

A further object is to provide a self supporting and self contained automatic carrier fender acting as a yielding buffer in all its positions against impact with the rigid forward portions of the vehicle, in which the height will not be sufficiently great to obstruct the view of the operator of the car.

A still further object is to provide adjustable automatic spring members for the operation of the fender into its fully recoiled carrier position, and an additional object is to provide means for readily attaching pneumatic cushioning means to the rigid net supports of the fender for the further protection of the person struck.

I attain these several objects by the arrangement and combination of the various parts illustrated in the accompanying drawings in which—

Figure 1:
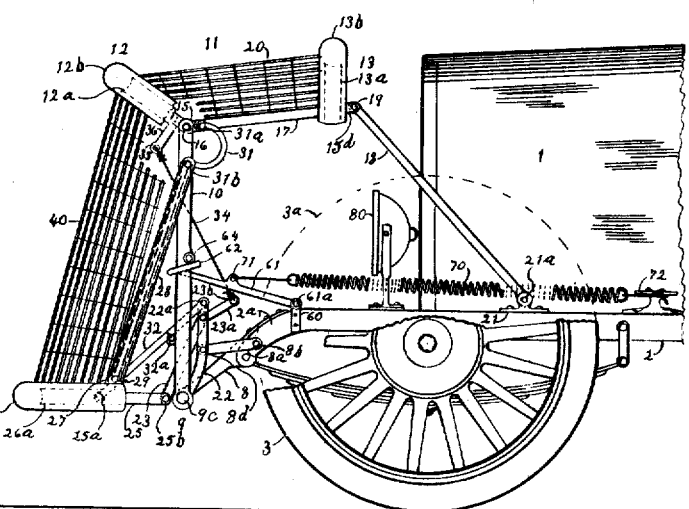
Figure 8:
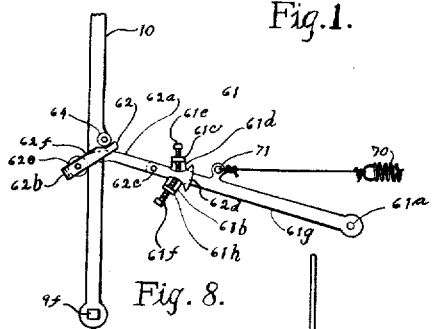
Figure 3:
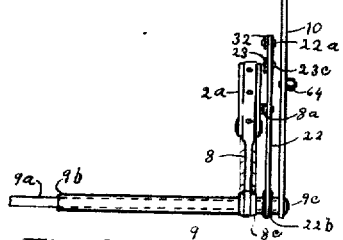
Figure 2:
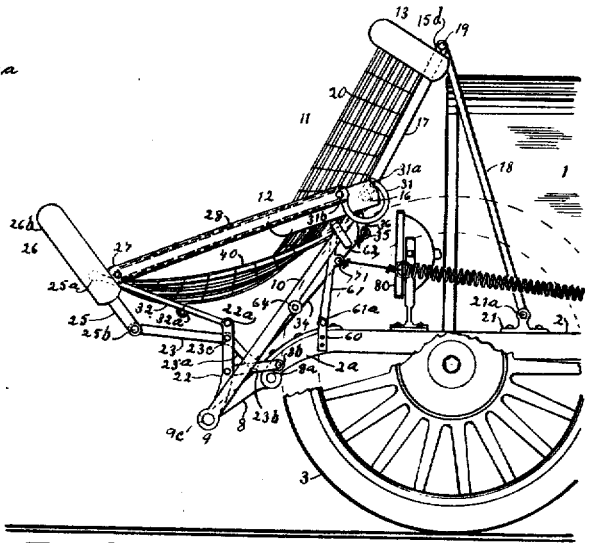
Figure 4:
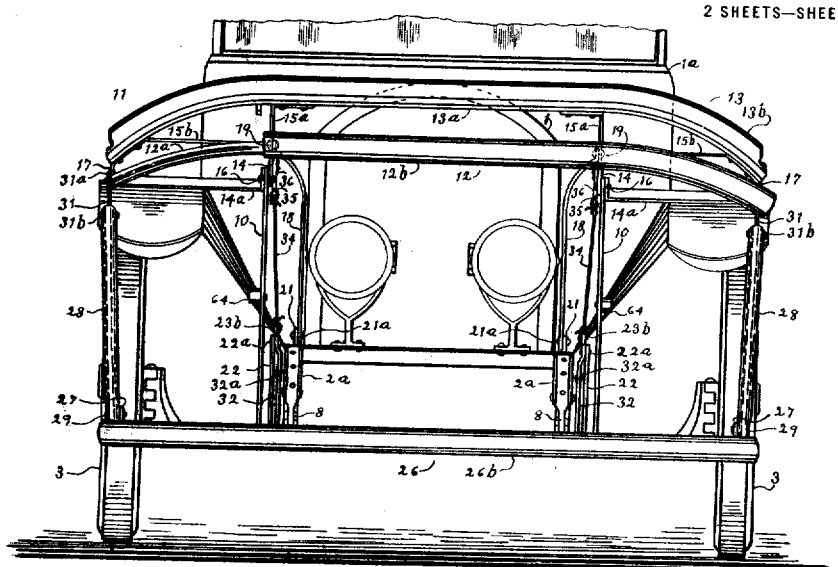
Figure 5:
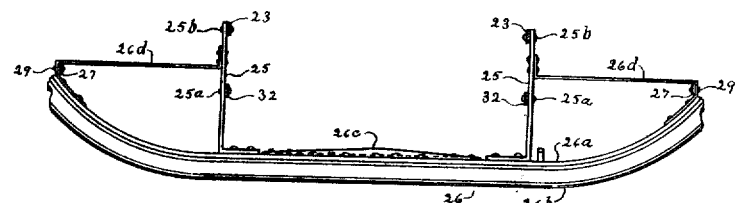
Figure 6:
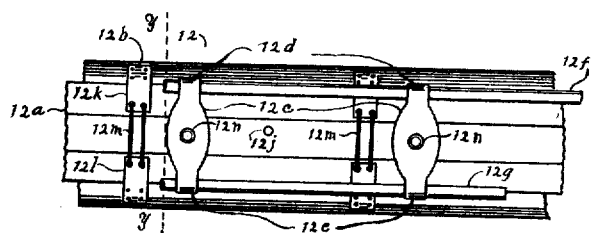
Figure 7:
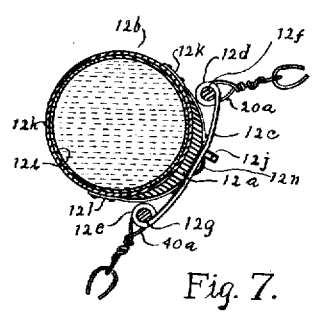

Figure 1, is a side elevation of my invention as it appears in its normal position when attached to an automobile. The upper forward corner of the frame, side braces, operating springs of the fender, and wheel of the car being partly broken away, and the mud guard wholly omitted. Fig. 2, is a side elevation of the fender corresponding to Fig. 1, showing the fender in the fully recoiled position it will assume under the pull of the operating springs (of which there is one at either side the car) acting in conjunction with the impact of the person struck to operate the fender into its fully recoiled position, the lower portion of the fender being drawn upward and extended forward (with relation to the upper portion of the fender) so as to slacken the forward net into a pocket for the retention of the person struck. Fig. 3, is a front view of one side of the rockshaft supporting the forward portions of the fender. Fig. 4, is a front elevation of the fender in its normal position on the vehicle with the nets and operating means omitted. Fig. 5, is a detached view of the lower net support as it would appear when viewed from above. Fig. 6, is an enlarged back view of a portion of the central net support showing the rods to which the nets are attached, secured on the back of said support, and also showing the means of attaching the pneumatic cushioning means to the various frame pieces. Fig. 7, is a cross section of the central support on the line Y, Y, of Fig. 5, showing the preferable form of material used in the construction of this portion of the frame with the cushion element inflated and secured thereto, also showing portions of each of the nets as secured to the said frame piece. Fig. 8, is a detached and enlarged side view of the automatic operating means of the fender showing the details of a modification for the adjustment and regulation of the releasing means of the automatic spring operating means.

Describing the drawings in detail the numeral 1 refers to the hood of the car, 1ᵃ (Fig. 4,) to the dash, 2 to the side frame, 2ᵃ to the forward portion of the same, 3 to the forward wheels, and 3ᵃ to the dotted lines indicating the continuation of the outer rim of the wheel.

To the forward portion 2ᵃ of each of the side frames 2, of the vehicle, is rigidly secured the brackets 8 the forward portion of the said brackets being provided with suitable apertures 8ᶜ (Fig. 3,) to pivotally accommodate a rockshaft 9 which is provided with an arm 10 at each end, that is, at either side of the car, the said arms 10 being secured on the said rockshaft 9 by means of the heads 9ᶜ swaged thereon.

On the upper ends of the arms 10 is pivotally secured the forward portion 12 of the upper frame member 11, said frame member 11 consisting of two circular parts 12ᵃ, 13ᵃ, (shown in dotted outline in Fig. 1,) having arms 14, 15ᵃ, (Fig. 4) rigidly attached to the said parts respectively, and braces 14ᵃ, 15ᵇ, respectively, securing the outer ends of the circular parts 12ᵃ, 13ᵃ, to the arms 14, 15ᵃ, respectively. The said arms 14, 15ᵃ, are rigidly secured to the bars 15, (Fig. 1,) which are pivotally attached to the arms 10 of the rockshaft 9 by means of the pins 16. The arms 14, 15ᵃ, and the bars 15 may be made in separate pieces which are afterward riveted together in their proper relation, but in order to insure absolute rigidity of the parts I prefer to forge each set from a single piece. The said upper frame member 11 is provided with the net 20 which may be secured by any convenient means to the parts 12ᵃ, 13ᵃ, but is preferably attached to rods secured in knuckles at the back of the frame pieces as shown in Fig. 6.

Rearwardly on the bars 15 at the part 15ᵈ are pivotally secured the upper ends of the tilting bars 18 by means of the pins 19, the lower ends of the said tilting bars being pivotally secured to the side frames 2 by means of the pins 21ᵃ in the brackets 21.

On the rockshaft 9 is loosely secured the short arms 22, the said arms being secured in an upright position as fixed brackets by means of the links 8ᵃ and the pins 8ᵇ, 8ᵈ, (Fig. 1) which secures the said arms to the forward portions 2ᵃ of the side frames 2, and to each of the brackets 22 is pivotally attached a pendant link 23 by means of a pin 23ᶜ. To the lower ends of the links 23 are pivotally secured the arms 25, the said arms 25 being rigidly secured to the inner face of the circular lower frame member 26, the said arms corresponding to the arms 14, 15ᵃ of the upper frame member 11.

At the outer corners of the circular lower frame piece 26ᵃ are secured the ears 27 (Fig. 5) and to the said ears are attached the lower ends of sections of pliable tubing 28 by means of the pins 29, the upper portion of the said pliable tubing being secured to the circular metal supports 31 by means of the pins 31ᵇ (Fig. 4) which circular supports are in turn secured to the brace bars 17 by means of the pins 31ᵃ, the said brace bars 17 being rigidly attached to the outer corners of the circular frame pieces 12ᵃ, 13ᵃ.

The folding braces 32, at the forward ends are pivotally secured to the arms 25 of the lower frame member by means of the pins 25ᵃ (Fig. 5), and at the rearward ends are pivotally secured to the upper part of the brackets 22 by means of the pins 22ᵃ, the said braces 32 being adapted to fold by means of the hinge pins 32ᵃ when it is desired to fold the lower frame member up out of the way. Referring to Fig. 5, 26ᶜ represents a light piece of channel iron riveted on the straight portion of the frame piece 26ᵃ, the flanges of said channel iron being sloped down toward the ends and faced backward to form a brace.

The nets may be secured to the upper and lower frame members by any convenient means, but I prefer to utilize the means shown in Figs. 6 and 7 in which Fig. 6 is a rear elevation of a portion of the upper frame part 12, and Fig. 7 is a cross-section of same on the line Y, Y, looking to the right with the said frame part in its true normal position, both these views also showing the means of attaching the pneumatic cushioning means employed for protecting the person struck from the rigid metal of the fender. Referring to the figures last named, 12ᵃ is the circular metal frame of the forward portion 12 of the upper frame member 11, this piece being preferably made of cushion tire channel on the back of which is secured by means of rivets 12ⁿ a series of double ended knuckles 12ᶜ, provided with eyes 12ᵈ and 12ᵉ in which is secured the rods 12ᶠ and 12ᵍ respectively, and when chain is used in the construction of the net such net may be secured to the frame piece simply by passing the rods through the link portions 40ᵃ and 20ᵃ in assembling the parts, other portions of the nets being secured to their several frame members in substantially the same manner. Although I have designated cushion tire channel as the preferable material for the frame piece 12ᵃ as shown in Fig. 7, (including also the other cushion frame pieces) this part may just as well be made of wood backed by a thin strip of steel, the object being of course to secure lightness coupled with rigidity and strength. The cushion member 12ᵇ comprises a thin flexible outer tube 12ʰ (Fig. 7) and a flexible inner tube 12ⁱ provided with the valve 12ʲ for the inflation of the said inner tube. The said cushioning element is secured in position on the fender frame by means of ears 12ᵏ and 12ˡ, which are secured at frequent intervals to the outer tube 12ʰ, their free ends being held in position at the back of the frame piece by means of clasps 12ᵐ as shown in Fig. 6. The other frame members being equipped in the same manner, when properly inflated the cushion members will provide ample yielding protection against impact with the rigid portions of the various frame members.

The upper portion of the pendant link 23 is provided with the elbow portion 23<sup>a</sup> having the eye 23<sup>b</sup> in which is secured one end of the cord 34 the other end of which is secured in the eyes 35 of the brackets 36 which are rigidly secured to the arms 14. The object of this latter arrangement being to hold the lower frame member firmly in place against incessant oscillation when the machine is run on the road, also to prevent the said lower frame member from jumping instantly forward when the body of a person strikes centrally on the forward net, and further to provide leevrage to draw the upper portions of the fender backward when the forward net is struck centrally.

To the side frame 2 at each side of the car is secured an ear 60 to which is pivotally attached an automatic operating lever 61, by means of the pins 61<sup>a</sup>, the forward or free end of each lever being turned backward sidewise and provided with a finger 62 which engages the rollers 64 which in turn are pivotally attached to the arms 10, the said fingers 62 when the fender is in its normal position, are caught under the rollers 64 of the arms 10 and held firmly in position by means of the extension springs 70 each of which at the forward end is secured to the eye 71 of the lever 61 and being extended so as to exert the required force is secured at its rearward end to the cleat 72 which is made fast to the side frame 2. The hook or finger 62 of each operating lever 61 being held firmly in position against the roller 64 of the arm 10 by means of the extension spring 70, and the said fingers 62 being inclined slightly upward at its backward end, the fender will be disposed to retain its normal position under all usual circumstances; but when a person is run down and collides with the fender with sufficient force to constitute an otherwise serious accident, the upper portion of the fender will be driven freely backward under the impact of the blow, releasing the hooked operating lever 61 from engagement with the roller 64. When the said operating lever 61 is released from the roller 64 the looped portion of the said lever 61 runs upward on the arm 10 and the extension spring 70 then exerts its force directly in drawing the upper portion of the fender backward into the fully recoiled position where it is held firmly by the more direct action of the springs.

In Fig. 8 is shown a modification of the automatic operating means (detached) the object of which is to provide means for adjusting the releasing means of the automatic operating means of the fender, and also to provide means for facilitating the movement of the free end of the said operating levers 61 on the arms 10 of the rockshaft. In the modification shown 61 refers to the operating levers as a whole, 61<sup>g</sup> to the main arm of the member, and 62<sup>a</sup> to the adjustable outer portion which is pivoted to the portion 61<sup>g</sup> by means of the pins 62<sup>c</sup>. The part 62<sup>a</sup> comprises a flat bar of metal with the outer end doubled back at 62<sup>b</sup> so as to form a lateral hook 62<sup>f</sup> having the finger 62 engaging the roller 64 of the arm 10 of the rockshaft. The finger 62 being set at an angle with the line of movement of that portion of the rockshaft arm 10 which has the roller 64 pivoted thereon it will be seen that when the spring 70 is drawn taut the angle of the said finger 62 pressing firmly up against the roller 64 will be disposed to hold the arm 10 and therewith the entire fender firmly in its normal position. Also, it will be seen that when the arm 10 is rocked backward at the top the hook 62<sup>f</sup> will be depressed downward until the roller 64 passes off the end of said finger 62, whereupon the outer end of the arm 61 carrying the roller 62<sup>e</sup> in the looped portion is carried forcibly upward by means of the springs 70 giving a continually more direct "purchase" for the operation of the fender, the office of the roller 62<sup>e</sup> being to facilitate the upward movement of the operating arms 61 on the rockshaft arms 10. It should be remarked that the hook portion 62<sup>f</sup> is of such distance from the part 62<sup>a</sup> as to neatly grasp the sides of the arms 10 while permitting their free movement rearward.

In order that the angle of the finger 62 may be shifted so as to regulate the automatic releasing means, I provide the portion 61<sup>g</sup> with the wings 61<sup>b</sup>, 61<sup>d</sup> having respectively the lips 61<sup>c</sup>, 61<sup>h</sup>, the said lips carrying respectively the set-screws 61<sup>e</sup>, 61<sup>f</sup>, the ends of which engage oppositely with the movable head portion 62<sup>d</sup> of the part 62<sup>a</sup>. It is then obvious that the part 62<sup>a</sup> being pivoted to the part 61<sup>g</sup> by means of the rivet pin 62<sup>c</sup> when one of the set-screws is loosened and the other correspondingly tightened the angle of the finger 62 will be changed accordingly, the releasing means being thereby regulated as desired.

Referring to Fig. 2, it will be seen that by means of the folding brace bar 32, which is connected with the lower frame member at 25<sup>a</sup> and with the fixed bracket 22 at 22<sup>a</sup>, the lower frame member will be projected forwardly of its normal position, with respect to the upper frame member, as the upper portion of the fender is recoiled, and as said lower frame member is carried upward at its forward end by means of the pliable side supports 28, the forward net being therefore slackened, a hammock-like pocket will be formed for the retention of the person struck, the tilting bars 18 tilting the rearward portion of the upper frame upward so as to form a complete protection against impact with the hood of the car. On referring to Fig. 2, it will be seen that the circular hanger 31 permits the pliable side supports 28 to swing clear of the cushion member 12<sup>b</sup>, it being obvious that without this arrangement of the parts the said member 12<sup>b</sup> would interfere with the free movement of the said swing supports as the fender is moved into its recoiled position.

In the construction of the rockshaft 9 I prefer to use a square inner bar 9<sup>a</sup> passing through corresponding apertures 9<sup>f</sup> (Fig. 8,) in the arms of the rockshaft. By passing the said bar 9<sup>a</sup> through a suitable section of light close fitting outer tubing 9<sup>b</sup> and swaging heads 9<sup>c</sup> (Fig. 3,) on the ends of said inner bar 9<sup>a</sup> so as to draw the arms of the rockshaft snugly up against the outer tubing 9<sup>b</sup> the said rockshaft as a whole will be neat and very strong. It will be obvious that the upward movement of the lower frame member may be considerably modified by securing the short arms 22 rigidly on the rockshaft 9, the links 8<sup>a</sup> being slightly extended forward and secured pivotally at their forward ends to the central portion of the pendant links 23. In such modification the cord 34, brackets 36, and elbow portions 23<sup>a</sup> of the pendant links 23 would be omitted.

As shown the extension springs 70 operate in conjunction with the impact of a person to impel the fender backward into its fully recoiled position, but it is obvious that if so desired a very light spring may be employed and the lever 61 may be utilized simply as a ratchet to retain the fender in whatever position it should attain under impact with a person. Also it is obvious that a resisting spring may be employed to operate against the impact of a person, if so desired, the said resisting spring being preferably an extension spring secured for instance to the heel of the upper frame member and at any convenient point on the side frames 2.

Briefly described, when a person is run down and struck by the fender, its action is as follows: The cushion element 26<sup>b</sup> of the lower frame member 26 sweeps the lower limbs forward, the heavier portion of the body being precipitated forcibly backward against the forward net and the inflated cushion element 12<sup>b</sup> of the upper frame member, the initial rearward depression induced by the impact of a body being presumably sufficient to release the inclined hooks or fingers 62 from the rollers 64 thus bringing the operating springs into action to fully depress the upper portion of the fender rearward. The lower frame member being attached suspensibly to the upper frame member by means of the pliable side supports 28 and to the brackets or arms 22 by means of the folding braces 32 and the pendant links 23, the forward portion of the said lower frame member is perforce carried upward in the arc of a circle as the upper frame member is depressed rearward, the two members slightly approaching each other and slackening the forward net sufficiently to form a pocket-like carrier, the smaller net being tilted up by means of the tilting bars 18 so as to provide an effectual barrier against impact with the hood of the car.

It should be remarked that this invention may very readily be adapted to use on street cars and similar vehicles.

Having described my invention, what I claim as new is:—

1. The combination of a vehicle with an automatic pliable net fender comprising a rearwardly depressible and tilting upper frame member of two parts, supporting a pliable net, and in pivotal connection with the arms of a transverse rockshaft secured to the car by means of forwardly projecting brackets, the said upper frame member supporting the upper border of a main pliable net, and additional net supporting means comprising a lower frame member in pivotal connection with pendant links extending downward from upright brackets immovably secured to the side frames of the car and loosely secured on the said rockshaft supporting the lower border of the said main pliable net.

2. The combination of a vehicle with an automatic pliable net fender comprising a rearwardly depressible and tilting upper frame member of two parts, supporting a pliable net, and in pivotal connection with the arms of a transverse rockshaft secured to the car, the said upper frame member supporting also the upper border of a main pliable net, a lower frame member supporting the lower border of a main pliable net and in pivotal and extensible connection with pendant links pivotally secured to and extending downward from upright brackets immovably secured to the side frames of the car in an upright position, said pendant links supporting the heel of said lower frame member, and means comprising oblique folding pivotal connecting rods connecting the forward part of the lower frame member with the said upright brackets comprising means whereby the lower frame member will be held forward as the upper portion of the fender is rearwardly depressed.

3. The combination of a vehicle with an automatic pliable net fender comprising a rearwardly depressible and tilting upper frame member of two parts, the said parts comprising a near vertical and an oblique part, each part having arms rigidly secured thereto and rigidly joined to a horizontally positioned bar which in turn is pivotally connected at its forward portion to the upper ends of the arms of a transverse rockshaft secured to the car, the said vertical and oblique parts comprising the upper frame member and supporting a short net and providing also the upper support of the main pliable net, a lower frame member in pivotal connection with upright brackets rigidly secured to the side frames of the car supporting the lower border of the main pliable net, and means for effecting the complete rearward depression of the upper portion of the fender including means for supporting the fender in its rearwardly depressed position.

4. The combination of a vehicle with an automatic pliable net fender comprising a rearwardly depressible and tilting upper frame member including an oblique forward member and a normally nearly vertical member adapted to be inclined rearwardly, said members being rigidly linked together in angular relation and pivotally connecting with the arms of a transverse rockshaft secured to the car, the forward part of the upper frame member supporting the upper border of the main pliable net, and a lower frame member in pivotal connection with upright brackets, connecting means including hangers pendant to said upright brackets and further including oblique folding pivotal connecting rods connecting the forward portion of the lower frame member of the fender with said upright brackets and means comprising pliable swing supports secured to the forward outer corners of the upper frame member and attached to the forward outer corners of the extensible lower frame member as yielding swing supports therefor.

5. The combination of a vehicle with an automatic pliable net fender comprising a rearwardly depressible and tilting upper frame member including an oblique forward member and a normally nearly vertical member adapted to be inclined rearwardly, said members being rigidly linked together in angular relation and pivotally connecting with the arms of a transverse rockshaft secured to the car, the forward part of the upper frame member supporting the upper border of the main pliable net, and a horizontally positioned lower frame member in pivotal and extensible connection with upright brackets, connecting means including hangers pendant to the said upright brackets and further including oblique folding pivotal connecting rods connecting the forward portion of the lower frame member of the fender with said upright brackets, pliable swing supports connecting the lower frame member with the upper frame member, and means comprising circular hangers pivotally secured to the upper frame member and to which the upper ends of the pliable side supports are attached comprising means whereby the said pliable side supports are adapted to swing clear of the upper frame member as the fender is moved rearwardly into the carrier position.

6. The combination of a vehicle with an automatic pliable net fender comprising a rearwardly depressible and tilting upper frame member including an oblique forward member and a normally nearly vertical rearward member rigidly linked together in angular relation each having arms rigidly secured thereto which are rigidly joined to a horizontally positioned bar which in turn is pivotally connected with the arms of a transverse rockshaft secured to the car, the forward part of the upper frame member supporting the upper border of the main pliable net, a pendant lower frame member in pivotal connection with upright brackets, means connecting the lower frame member with the said brackets including pivotal elbow hangers pendant to said brackets supporting the heel of said lower frame member, pivotal folding connecting rods secured to the forward part of the said lower frame member and the upper portion of said brackets acting as a brace for said lower frame member, and means comprising pliable sections of light cable connecting the rearward ends of said pendant elbow links with the upper frame member to steady the lower frame member in its various positions and to prevent its springing forward under the impact of the central portion of the forward net.

7. The combination of a vehicle with an automatic fender, normally acting as a recoiling buffer and subsequently as a retaining carrier, comprising a rearwardly depressible and tilting upper frame member supporting a net, said upper frame member including an oblique forward member and a normally nearly vertical rearward member each provided with arms and rigidly joined together in angular relation, pivotal connecting means connecting the said upper frame member with the arms of a transverse rockshaft secured to the car, the forward part of the upper frame member supporting the upper border of the main pliable net, a lower frame member pivotally suspended from and braced to upright brackets supporting the lower border of the main pliable net, means pivotally and suspensibly connecting the lower frame member with the said upright brackets including pivotal elbow hangers and folding brace rods, pliable side supports for the lower frame member and means comprising tilting bars pivotally secured on the side frames of the car and supporting the rearward part of the upper frame member.

8. The combination of a vehicle with an automatic fender, normally acting as a recoiling buffer and subsequently as a retaining carrier, comprising an upper frame member in pivotal connection with the arms of a rockshaft, the said rockshaft being secured transversely to the forward part of the car, a lower frame member in pivotal connection with upright brackets affixed to the rockshaft and side frames of the car, the said upper and lower frame members supporting pliable nets, and means comprising inclined tilting bars pivotally connected to the side frames of the car and the rearward portion of the upper frame member supporting the rearward portion of the said upper frame member whereby the said upper frame member will be tilted up vertically when the upper portion of the fender is depressed rearwardly.

9. The combination of a vehicle with an automatic fender, normally acting as a recoiling buffer and subsequently as a retaining carrier, comprising an upper frame member in pivotal connection with the arms of a rockshaft, said rockshaft being secured transversely to the car, the upper and lower frame members together supporting a main forward net carried normally in a semi-vertical position and a secondary net carried normally in a near horizontal position, means whereby the upper portion of the fender will be depressed rearwardly under the impact of a body, spring members comprising extension springs secured to cleats at the sides of the car and engaging with pivotal operating levers also secured to the sides of the car, the free ends of said pivotal levers being normally caught under rollers pivotally attached on the arms of a rockshaft and comprising a trigger whereby the said extension springs may be brought into action to assist in the operation of the fender when the upper portion of the said fender is initially depressed backward sufficiently to release said trigger, and means comprising tilting bars pivotally secured at the sides of the car supporting the rearward portion of the upper frame member and constituting means whereby the said upper frame member will be tilted up vertically to protect the person run down from impact with the rigid forward portions of the car when the fender assumes its fully recoiled carrier position.

10. The combination of a vehicle with an automatic fender, normally acting as a recoiling buffer and subsequently as a retaining carrier, comprising an upper frame member in pivotal connection with the arms of a rockshaft, said rockshaft being secured transversely to the car, the upper and lower frame members together supporting a main forward net carried normally in a semi-vertical position and a secondary net carried normally in a near horizontal position, means whereby the upper portion of the fender will be depressed rearwardly under the impact of a body, means comprising tilting bars pivotally secured at the sides of the car and supporting the rearward portion of the upper frame member and constituting means whereby the said upper frame member will be tilted up vertically to protect the person run down from impact with the rigid forward portions of the car when the fender assumes its fully recoiled carrier position, and operating means including lever arms pivotally attached to the side frames of the car provided with inclined hooks or fingers detachably engaging with rollers on the arms of said transverse rockshaft, and further including extension springs in connection with the side frames of the vehicle and the said pivotal lever arms whereby the fender is actuated into its fully recoiled position.

11. The combination of a vehicle with an automatic fender, normally acting as a recoiling buffer and subsequently as a retaining carrier, comprising an upper frame member in pivotal connection with the arms of a rockshaft, said rockshaft being secured transversely to the car, the upper and lower frame members together supporting a main forward net carried normally in a semi-vertical position and a secondary net carried normally in a near horizontal position, means whereby the upper portion of the fender will be depressed rearwardly under the impact of a body, means comprising tilting bars pivotally secured at the sides of the car and supporting the rearward portion of the upper frame member and constituting means whereby the said upper frame member will be tilted up vertically to protect the person run down from impact with the rigid forward portions of the car when the fender assumes its fully recoiled carrier position, means including extension springs in connection with pivotal lever arms affixed on the side frames of the car, the free ends of said lever arms engaging with rollers on the arms of a rockshaft and automatically releasable therefrom, and automatic releasable means comprising hooks or fingers on said pivotal lever arms which are set at an angle with the lineal dimensions of said lever arms in order that the said fingers acting under the continuous pull of the said extension springs will hold the fender firmly yet releasably in its normal position in all positions of the car.

12. The combination of a vehicle with an automatic fender, normally acting as a recoiling buffer and subsequently as a retaining carrier, comprising an upper frame member of two parts supporting a horizontal or an inclined pliable net and the upper border of a semi-vertical net, the upper frame member being in pivotal connection with the arms of a rockshaft, said rockshaft being pivotally secured to the forward part of the car, tilting bars supporting the rearward portion of the upper frame member, a lower frame member supporting the lower border of the said semi-vertical net and in pivotal and extensible connection with upright brackets, and means including folding connecting bars pivotally connecting the forward portion of the lower frame member with said upright brackets whereby the said lower frame member with respect to the upper frame member will be extended forwardly when the upper portion of the fender is depressed rearwardly on the said rockshaft under impact with the human body.

13. The combination of a vehicle with an automatic fender, normally acting as a recoiling buffer and subsequently as a retaining carrier, comprising an upper frame member in pivotal connection with the arms of a rockshaft, said rockshaft being secured transversely to the car, the upper and lower frame members together supporting a main forward net carried normally in a semi-vertical position and a secondary net carried normally in a near horizontal position, means whereby the upper portion of the fender will be depressed rearwardly under the impact of a body, means comprising tilting bars pivotally secured at the sides of the car supporting the rearward portion of the upper frame member and constituting means whereby the said upper frame member will be tilted up vertically to protect the person run down from impact with the rigid forward portions of the car when the fender assumes its fully recoiled carrier position, and means for rearwardly depressing the upper portion of the fender on the rockshaft including extension springs secured at the sides of the car and engaging with pivotal lever arms also secured to the sides of the car, the free ends of said lever arms being carried forward and releasably caught under projecting rollers pivotally attached on the arms of the rockshaft and comprising a trigger whereby the said extension springs may automatically be brought into action to assist in the operation of the fender when the upper portion of said fender is initially depressed sufficiently to release said trigger.

14. The combination of a vehicle with an automatic fender, normally acting as a recoiling buffer and subsequently as a retaining carrier, comprising an upper frame member in pivotal connection with the arms of a rockshaft, said rockshaft being secured transversely to the car, the upper and lower frame members together supporting a main forward net carried normally in a semi-vertical position and a secondary net carried normally in a near horizontal position, means whereby the upper portion of the fender will be depressed rearwardly under the impact of a body, means comprising tilting bars pivotally secured at the sides of the car supporting the rearward portion of the upper frame member and constituting means whereby the said upper frame member will be tilted up vertically to protect the person run down from impact with the rigid forward portions of the car when the fender assumes its fully recoiled carrier position, means for rearwardly depressing the upper portion of the fender on the rockshaft including extension springs secured at the sides of the car, and means comprising adjustable automatic operating means whereby the releasing means of the automatic operating means may be adjusted to provide more or less resistance as required.

15. The combination of a vehicle with an automatic fender, normally acting as a recoiling buffer and subsequently as a retaining carrier, comprising an upper frame member in pivotal connection with the arms of a rockshaft, said rockshaft being secured transversely to the car, the upper and lower frame members together supporting a main forward net carried normally in a semi-vertical position and a secondary net carried normally in a near horizontal position, means whereby the upper portion of the fender will be depressed rearwardly under the impact of a body, means comprising tilting bars pivotally secured at the sides of the car supporting the rearward portion of the upper frame member and constituting means whereby the said upper frame member will be tilted up vertically to protect the person run down from impact with the rigid forward portions of the car when the fender assumes its fully recoiled carrier position, means for rearwardly depressing the upper portion of the fender on the rockshaft including extension springs secured at the sides of the car, automatic operating means, and adjustable means comprising pivotal operating levers each in two parts pivotally connected together, one of each of the parts being provided with wings oppositely secured thereon, lips turned on the said wings carrying set-screws, the said set-screws engaging the opposite sides of a head on the other part of said operating lever whereby the releasing means of the automatic operating means may be adjusted with regard to its angle of engagement with a pivotal roller on each of the arms of a rockshaft to provide more or less resistance against the initial movement of the fender as required.

16. The combination of a vehicle with an automatic fender, normally acting as a recoiling buffer and subsequently as a retaining carrier, comprising an upper frame member in pivotal connection with the arms of a rockshaft, said rockshaft being secured transversely to the car, the upper and lower frame members together supporting a main forward net carried normally in a semi-vertical position and a secondary net carried normally in a near horizontal position, means whereby the upper portion of the fender will be depressed rearwardly under the impact of a body, means comprising tilting bars pivotally secured at the sides of the car supporting the rearward portion of the upper frame member and constituting means whereby the said upper frame member will be tilted up vertically to protect the person run down from impact with the rigid forward portions of the car when the fender assumes its fully recoiled carrier position, means for rearwardly depressing the upper portion of the fender on the rockshaft including extension springs secured at the sides of the car, automatic operating means comprising pivotal operating levers actuated by springs, automatic releasing means comprising a finger on each of the operating levers in angular engagement with rollers pivotally secured on the arms of a rockshaft, and means for facilitating the movement of the operating levers on the arms of the said rockshaft comprising rollers pivotally secured in the looped portion of the said operating arms.

17. The combination of a vehicle with an automatic fender, normally acting as a recoiling buffer and subsequently as a retaining carrier, comprising an upper frame member in pivotal connection with the arms of a rockshaft, said rockshaft being secured transversely to the car, the upper and lower frame members together supporting a main forward net carried normally in a semi-vertical position and a secondary net carried normally in a near horizontal position, means whereby the upper portion of the fender will be depressed rearwardly under the impact of a body, means comprising tilting bars pivotally secured at the sides of the car and supporting the rearward portion of the upper frame member and constituting means whereby the said upper frame member will be tilted up vertically as the fender is depressed rearwardly to protect the person run down from impact with the rigid forward portions of the car when the fender assumes its fully recoiled carrier position, means for rearwardly depressing the upper portion of the fender on the rockshaft including extension springs secured to cleats at the sides of the car and engaging with pivotal lever arms also secured to the sides of the car, the free ends of said arms being carried forward and releasably caught under projecting rollers on the arms of the rockshaft and comprising a trigger whereby the said extension springs may be brought into action to assist in the operation of the fender when the upper portion of said fender is initially depressed sufficiently to release said trigger, means comprising folding braces for the lower frame member, and means comprising pliable side supports connecting the forward outer portions of the lower frame member with the sides of the upper frame member in order that the forward portion of the lower frame member will be carried upward as the upper portion of the fender is depressed rearwardly and the forward net will be slackened so as to form a pocket carrier.

18. The combination of a vehicle with an automatic fender, normally acting as a recoiling buffer and subsequently as a retaining carrier, comprising an upper frame member of two parts supporting a horizontally inclined net and the upper border of a forward semi-vertical net, the said upper frame member being in pivotal connection with the arms of a rockshaft secured transversely on the car, an extensible lower frame member supporting the lower border of the said semi-vertical net, pliable side supports whereby the forward part of the lower frame member is connected with the sides of the upper frame member, means whereby the upper part of the fender is adapted to be depressed rearwardly under the impact of a body, means comprising spring members which are adapted to assist in the complete rearward depression of the upper portion of the fender in order that it may assume the carrier position, folding brace rods connecting the forward portion of the lower frame member with upright brackets, pendant links in pivotal connection with the said upright brackets and pivotally supporting the heel of the lower frame member, and means including elbows in said pendant links, eyes in the rearward ends of said elbows, cords secured therein and attached to short brackets on the upper frame member in order that the said lower frame member will be supported firmly in the various positions of the fender.

19. The combination of a vehicle with an automatic fender, normally acting as a recoiling buffer and subsequently as a retaining carrier, comprising an upper frame member of two parts supporting a horizontally inclined net and the upper border of a semi-vertical net, the said upper frame member being pivotally connected to the arms of a rockshaft secured transversely to the car, an extensible lower frame member in pivotal and extensible connection with an upright bracket, the said lower frame member supporting the lower border of the said semi-vertical net, means whereby the upper portion of the fender is adapted to be recoiled backward on the rockshaft including spring members, extensible means for the lower frame member including means whereby the lower frame member is adapted to be forcibly extended forward and upward when the upper portion of the fender is rearwardly depressed, and cushioning means comprising means for readily attaching or detaching an inflated cushion to the rigid net supports of the fender including ears secured on a light outer tubing and fastenings therefor whereby the said outer tubing may be readily secured to the various fender frames substantially as described, an inflatable inner tube having been previously inserted in the outer tubing and provided with a valve for inflation.

MARCUS L. KEIZUR.

Witnesses:
R. M. STURDEVANT,
CARL BAUERS.

Copies of this patent may be obtained for five cents each, by addressing the "Commissioner of Patents, Washington, D. C."